(12) United States Patent
Kim et al.

(10) Patent No.: US 10,418,670 B2
(45) Date of Patent: Sep. 17, 2019

(54) METHOD OF MANUFACTURING LITHIUM SECONDARY BATTERY AND LITHIUM SECONDARY BATTERY MANUFACTURED BY THE SAME

(71) Applicant: LG Chem, Ltd., Seoul (KR)

(72) Inventors: Il Hong Kim, Daejeon (KR); Kyoung Ho Kim, Daejeon (KR); Hoe Jin Hah, Daejeon (KR)

(73) Assignee: LG Chem, Ltd. (KR)

( * ) Notice: Subject to any disclaimer, the term of this patent is extended or adjusted under 35 U.S.C. 154(b) by 107 days.

(21) Appl. No.: 15/521,734

(22) PCT Filed: Jun. 24, 2016

(86) PCT No.: PCT/KR2016/006732
§ 371 (c)(1),
(2) Date: Apr. 25, 2017

(87) PCT Pub. No.: WO2016/209014
PCT Pub. Date: Dec. 29, 2016

(65) Prior Publication Data
US 2018/0123186 A1 May 3, 2018

(30) Foreign Application Priority Data

Jun. 26, 2015 (KR) .................. 10-2015-0091086

(51) Int. Cl.
| | | |
|---|---|---|
| H01M 10/44 | (2006.01) |
| H01M 4/505 | (2010.01) |
| H01M 10/052 | (2010.01) |
| H01M 4/525 | (2010.01) |
| H01M 2/02 | (2006.01) |

(52) U.S. Cl.
CPC ......... *H01M 10/446* (2013.01); *H01M 4/505* (2013.01); *H01M 4/525* (2013.01); *H01M 10/052* (2013.01); *H01M 2/0207* (2013.01)

(58) Field of Classification Search
None
See application file for complete search history.

(56) References Cited

U.S. PATENT DOCUMENTS

| | | |
|---|---|---|
| 6,677,082 B2 | 1/2004 | Thackeray et al. |
| 2006/0099508 A1 | 5/2006 | Thackeray et al. |
| 2011/0052990 A1 | 3/2011 | Yanagida et al. |
| 2013/0078518 A1 | 3/2013 | Thackeray et al. |
| 2013/0230782 A1 | 9/2013 | Baek |
| 2013/0260249 A1 | 10/2013 | Choi |
| 2014/0193714 A1 | 7/2014 | Kim et al. |
| 2015/0171427 A1 | 6/2015 | Eckl et al. |
| 2018/0183056 A1 | 6/2018 | Takami et al. |

FOREIGN PATENT DOCUMENTS

| | | |
|---|---|---|
| CN | 104078699 A | 10/2014 |
| JP | 2005235628 A | 9/2005 |
| JP | 2011029000 A | 2/2011 |
| JP | 2011071090 A | 4/2011 |
| JP | 2012195126 A | 10/2012 |
| JP | 2014132572 A | 7/2014 |
| JP | 2014197556 A | 10/2014 |
| KR | 20130100625 A | 9/2013 |
| KR | 20130111834 A | 10/2013 |
| KR | 20130122279 A | 11/2013 |
| KR | 20150015303 A | 2/2015 |
| KR | 20150049896 A | 5/2015 |

OTHER PUBLICATIONS

Search report from International Application No. PCT/KR2016/006732, dated Oct. 4, 2016.
Extended European Search Report for Application No. EP16814727 dated Dec. 1, 2017.

*Primary Examiner* — Sarah A. Slifka
(74) *Attorney, Agent, or Firm* — Lerner, David, Littenberg, Krumholz & Mentlik, LLP

(57) ABSTRACT

Disclosed is a method of manufacturing a lithium secondary battery including a positive electrode active material, wherein the positive electrode active material includes one or more lithium transition metal oxides selected from compounds represented by Formula 1 defined in claim 1, and activation of the lithium secondary battery is conducted while changing charge/discharge voltage ranges and number of cycles depending on doping amount of $M_1$ in Formula 1.

19 Claims, 1 Drawing Sheet

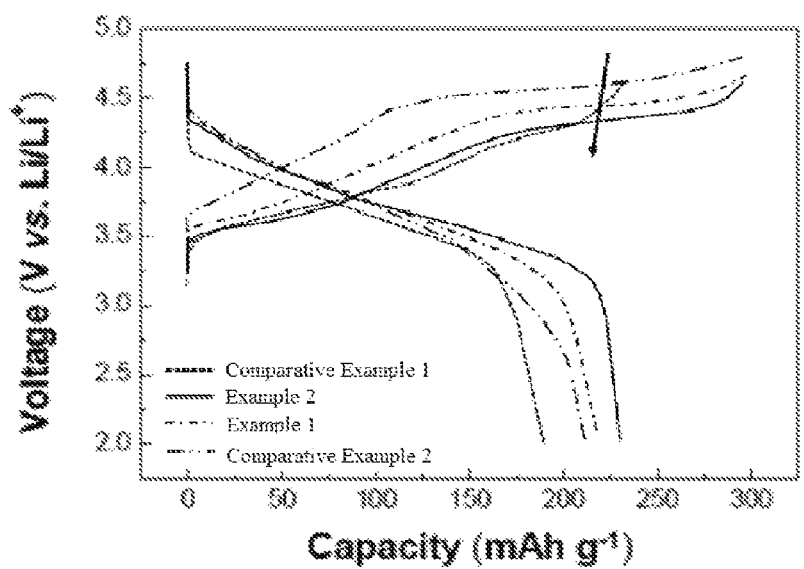

METHOD OF MANUFACTURING LITHIUM SECONDARY BATTERY AND LITHIUM SECONDARY BATTERY MANUFACTURED BY THE SAME

CROSS-REFERENCE TO RELATED APPLICATION

The present application is a national phase entry under 35 U.S.C. § 371 of International Application No. PCT/KR2016/006732, filed Jun. 24, 2016, which claims priority to and the benefit of Korean Patent Application No. 2015-0091086 filed on Jun. 26, 2015 with the Korean Intellectual Property Office, the contents of which are incorporated herein by reference.

TECHNICAL FIELD

The present invention relates to a method of manufacturing a lithium secondary battery and a lithium secondary battery manufactured by the same.

BACKGROUND ART

Technological development and increased demand for mobile equipment have led to rapid increase in the demand for secondary batteries as energy sources. Among such secondary batteries, lithium secondary batteries having high energy density and voltage, long lifespan and low self-discharge are commercially available and widely used.

The lithium secondary batteries generally use lithium-containing cobalt oxide ($LiCoO_2$) as an active material. Also, the use of lithium-containing manganese oxides such as $LiMnO_2$ having a layered crystal structure and $LiMn_2O_4$ having a spinel crystal structure and lithium-containing nickel oxide ($LiNiO_2$) has also been considered.

$LiCoO_2$ is currently used owing to superior physical properties such as cycle characteristics, but has disadvantages of low stability and high-cost due to use of cobalt, which suffers from natural resource limitations, and a limitation of mass-use as a power source for electric automobiles. $LiNiO_2$ is unsuitable for practical application to mass-production at a reasonable cost due to many features associated with preparation methods thereof.

On the other hand, lithium-manganese composite oxides such as $LiMnO_2$, $LiMn_2O_4$ and the like are advantageous in that they contain Mn, which is an abundant and environmentally friendly raw material, and thus are drawing much attention as a positive electrode active material that can replace $LiCoO_2$. However, such lithium manganese composite oxides also have disadvantages such as poor cycle characteristics and the like.

First, $LiMnO_2$ has disadvantages such as a low initial capacity and the like. In particular, $LiMnO_2$ requires dozens of charge/discharge cycles until a constant capacity is reached. In addition, disadvantageously, capacity reduction of $LiMn_2O_4$ becomes serious with increasing number of cycles, and in particular, at high temperature of 50° C. or more, cycle characteristics are rapidly deteriorated due to electrolyte decomposition, manganese dissolution and the like.

Meanwhile, lithium-containing manganese oxides include $Li_2MnO_3$ in addition to $LiMnO_2$ and $LiMn_2O_4$. Since $Li_2MnO_3$ is electrochemically inactive in spite of excellent structural stability, it cannot be used as a positive electrode active material of secondary batteries. Therefore, some prior technologies suggest use of a solid solution of $Li_2MnO_3$ and $LiMO_2$ (M=Co, Ni, $Ni_{0.5}Mn_{0.5}$, Mn) as a positive electrode active material.

Advantageously, such a positive electrode active material including $Li_2MnO_3$ is very cheap because it contains a great amount of Mn, has high capacity at high pressure and is stable. However, transition occurs from the layered structure to the spinel structure after an activation area in a broad range of 4.4 to 4.6V, thus resulting in weak contact between domains and serious structural change, limiting improvement in electrical properties.

In addition, such an excess manganese-containing positive electrode active material exhibits electrochemical activity because lithium and oxygen are isolated from the crystal structure at a high voltage of 4.3V to 4.5V. For this reason, to offer high capacity, operation is conducted at a high voltage. In this regard, an area which is inactivated during the initial activation process continues to be activated as cycles proceed, disadvantageously causing side-reaction of oxygen originating from the positive electrode active material with the electrolyte and generating a great amount of gas.

In particular, since pouch batteries, unlike rectangular and circular batteries, have a difficulty of maintaining their outer shapes with a predetermined force, pouches may be swollen and thus vented by the generated gas and the gas may remain trapped between electrodes, which interferes with uniform and smooth reactions of the electrodes. In addition, when gases are generated during cycles, gases trapped between electrodes disturb movement of Li ions and the disturbed Li ions are deposited on the surface of the negative electrode, resulting in Li plating which affects resistance increase and deterioration. Furthermore, irreversible Li ions are lost due to Li plating, irreversible capacity is increased during discharge and efficiency is thus decreased. In addition, the trapped gas continuously suppresses movement of Li ions at the initial cycle as well as the subsequent cycles, thus disadvantageously intensifying Li plating and greatly affecting lifespan reduction of batteries.

Accordingly, there is an urgent need for technologies to overcome these problems.

DISCLOSURE

Technical Problem

Therefore, the present invention has been made to solve the above and other technical problems that have yet to be resolved.

As a result of a variety of extensive and intensive studies and experiments, as described below, the inventors of the present application found that, when a secondary battery including lithium transition metal oxide having a certain formula as a positive electrode active material is manufactured by conducting activation while changing charge/discharge voltage ranges and the number of cycles depending on amount of certain element doped, structural stability of the positive electrode active material can be secured due to doping of the element, battery characteristics such as activation capacity and efficiency and the like can be maintained similar to battery characteristics manufactured by conducting conventional activation and the amount of gas generated during cycles can be reduced. Based on this finding, the present invention has been completed.

Technical Solution

In accordance with one aspect of the present invention, provided is a method of manufacturing a lithium secondary battery including a positive electrode active material wherein the positive electrode active material includes one or more lithium transition metal oxides selected from compounds represented by the following Formula 1 and activation of the lithium secondary battery is conducted while changing charge/discharge voltage ranges and number of cycles depending on doping amount of $M_1$ in Formula 1:

$$(1-x)LiM'O_{2-y}A_y-xLi_{2-w}E_wMn_{1-z}M_{1z}O_{3-y'}A_{y'} \qquad (1)$$

wherein

M' represents $Mn_aM_b$; M represents at least one selected from the group consisting of Ni, Ti, Co, Al, Cu, Fe, Mg, V, B, Cr, Zr, Zn and Period 2 transition metals;

$M_1$ represents at least one selected from the group consisting of Ru, Mo, Nb, Te, Re, Ti, Zr, Ir, Pt, Cr, S, W, Os, and Po;

E represents an alkali metal;

A represents at least one selected from the group consisting of anions of $PO_4$, $BO_3$, $CO_3$, F and $NO_3$; and $0<x<1$; $0 \leq y \leq 0.02$; $0 \leq y' \leq 0.02$; $0 \leq z \leq 0.6$; $0 \leq w \leq 0.5$; $0 \leq a \leq 0.5$; $0.5 \leq b \leq 1.0$; and $a+b=1$.

In this case, the range of x is specifically $0.4 \leq x \leq 0.6$, more specifically, x is 0.5, and $M_1$ specifically includes at least one selected from the group consisting of Ru, Mo, S, W, Os, and Po, more specifically, Ru. In addition, in Formula 1, the amount of $M_1$ doped (z) may be 0.6 or less, and is most preferably 10 to 30 mol %, based on the total moles of all transition metals contained in the compound represented by Formula 1.

In addition, the alkali metal of E may, specifically, be sodium (Na) or potassium (K).

Meanwhile, as can be seen from Formula 1, the compound represented by Formula 1 is a solid solution of $LiM'O_{2-y}A_y$ and $Li_2Mn_{1-z}M_{1z}O_{3-y'}A_{y'}$, each having a layered structure. $LiM'O_{2-y}A_y$ having a layered structure includes two $M'O_{2-y}A_y$ layers in one crystal structure and Li ions are present between $M'O_{2-y}A_y$ layers. In $Li_2Mn_{1-z}M_{1z}O_{3-y'}A_{y'}$, manganese is present as a stable tetravalent cation and contributes to stabilization of a layered structure due to high activation barrier for diffusion. In addition, $LiM'O_{2-y}A_y$ corresponds to an active area where reversible charge/discharge occurs, while $Li_2Mn_{1-z}M_{1z}O_{3-y'}A_{y'}$ corresponds to an inactive area where manganese is present as $Mn^{4+}$ below a voltage inducing electrochemical reaction, that is, an active voltage. Here, the active voltage depends on amount of $M_1$ doped.

As described above, $Li_2Mn_{1-z}M_{1z}O_{3-y'}A_{y'}$ is inactive at an active voltage or less, but undergoes electrochemical reaction resulting from lithium and oxygen isolated from the crystal structure at a voltage equal to or higher than the active voltage. In this case, as $MnO_2$ is produced, $Li_2Mn_{1-z}M_{1z}O_{3-y'}A_{y'}$ is converted to an active material.

Accordingly, the lithium secondary battery including one or more lithium transition metal oxides selected from the compounds represented by Formula 1 as a positive electrode active material according to the present invention requires activation at a high voltage.

However, typically, activation of manganese-excess lithium transition metal oxide is carried out by conducting charge/discharge once at a high voltage of 2.5V to 4.8V. That is, activation is carried out by conducting a cycle process including charging at a high voltage of 4.4V or higher and then discharging to 2.5V once.

However, the inventors of the present application found that, when the process including discharging to 2.5V as described above is conducted, a material having a $Mn^{3+}$ form is produced from the positive electrode active material, $Mn^{3+}$ is decomposed into $Mn^{2+}$ and $Mn^{4+}$ by heterogeneous reaction and, among them, $Mn^{2+}$ is dissolved into the electrolyte, disadvantageously causing deterioration of batteries. After one activation process, an inactivated area remains and is then continuously activated while cycles proceed at high voltage later, thus disadvantageously resulting in deposition of lithium isolated from the positive electrode active material on the negative electrode surface and generation of a great amount of gas caused by side-reaction between oxygen isolated therefrom and the electrolyte.

Accordingly, as a result of a variety of extensive and intensive studies and experiments, the inventors of the present application found that activation under certain conditions, rather than conventional activation processes, can solve the problems including manganese dissolution and presence of an inactivated area of the positive electrode active material after activation, thereby avoiding battery deterioration.

In addition, as a result of research on optimal activation conditions, the inventors of the present application found that the secondary battery including the lithium transition metal oxide represented by Formula 1 is characterized in that activation voltage is changed depending on amount of $M_1$ doped and established relations between the amount of $M_1$ doped and the most optimal activation conditions by determining suitable charge/discharge voltage ranges and number of cycles therefrom in consideration of the composition of the lithium transition metal oxide, in particular, the amount of $M_1$ doped.

Specifically, the charge/discharge voltage ($V_r$) range of the activation process can satisfy conditions of the following Formula I based on the positive electrode potential:

$$4.0\text{-}kD_r \leq V_r \leq 4.8\text{-}kD_r \qquad (I)$$

wherein k represents a voltage drop constant, with the proviso that $0.3 \leq k \leq 0.6$; and $D_r$ represents an amount of $M_1$ doped (z).

Here, the voltage drop constant k is a constant indicating a drop degree of the charge/discharge voltage range resulting from $M_1$ doping, based on the case where $M_1$ is not doped, more specifically $\frac{1}{3} \leq k \leq 0.5$.

The charge/discharge voltage ($V_r$) range of activation represented by the conditions of Formula I encompasses the entire voltage region at which charge/discharge occurs and means that charge/discharge is conducted within the range.

More specifically, the charge voltage of the activation may be equal to or higher than a voltage (active voltage: $V_a$) at which $Li_2Mn_{1-z}M_{1z}O_{3-y'}A_{y'}$ of lithium transition metal oxide begins to cause electrochemical reaction and may be equal to or lower than 4.8-$kD_r$ (V), the discharge voltage of the activation may be equal to or higher than 4.0-$kD_r$ (V) and be lower than the active voltage ($V_a$), and the active voltage can be slightly varied according to amount of $M_1$ doped, composition of the corresponding negative electrode active material, battery cell structure and the like. In this case, the active voltage ($V_a$) may be within the range satisfying conditions of the following Formula II:

$$V_a = V_{s.a}\text{-}kD_r \qquad (II)$$

wherein $V_{s.a}$ represents a standard active voltage in the case where $M_1$ is not doped, with the proviso that $4.3 \leq V_{s.a} \leq 4.5$; and K and $D_r$ are defined as in Formula I above.

Here, as described above, the active voltage ($V_a$) means a voltage at which $Li_2Mn_{1-z}M_{1z}O_{3-y'}A_{y'}$ begins to induce electrochemical reaction and is shown as a broad area in a graph of voltage with respect to capacity (see FIG. 1), and, as can be seen from Formula II, the active voltage of the secondary battery including the lithium transition metal oxide according to the present invention is acquired by subtraction of, a value obtained by multiplication of the voltage drop constant (k) with the amount of $M_1$ doped (z), from an active voltage ($V_{s,a}$) in case where $M_1$ is not doped, like Formula I.

As apparent from the fore-going, for example, when, regarding the lithium transition metal oxide according to the present invention, the amount of $M_1$ doped (z) is 0.3 and the voltage drop constant is ⅓, the active voltage is 4.2V to 4.4V. In this case, the activation according to the present invention can be carried out by charging at a voltage equal to or higher than 4.2V and equal to or lower than 4.7V and discharging at a voltage equal to or higher than 3.9V and lower than 4.2V, when the active voltage is 4.2V, can be carried out by charging at a voltage equal to or higher than 4.3V and equal to or lower than 4.7V and discharging at a voltage equal to or higher than 3.9V and lower than 4.3V, when the active voltage is 4.3V, and can be carried out by charging at a voltage equal to or higher than 4.4V and equal to or lower than 4.7V and discharging at a voltage equal to or higher than 3.9V and lower than 4.4V, when the active voltage is 4.4V.

Disadvantageously, when activation is carried out by charging and discharging at an excessively low voltage, not within the range, more inactivated areas of the positive electrode active material are still present and the desired effects of the present invention cannot be realized and, when activation is carried out by charging and discharging at an excessively high voltage, the positive electrode active material is greatly damaged and battery deterioration thus occurs.

The voltage range of activation can more specifically satisfy the following Formula IV:

$$4.2\text{-}kD_r \leq V_r \leq 4.6\text{-}kD_r \quad\quad\quad (IV)$$

wherein k represents a voltage drop constant, with the proviso that $0.3 \leq k \leq 0.6$; and $D_r$ represents an amount of $M_1$ doped (z).

Meanwhile, for high voltage activation, the number of charge/discharge cycles as well as the voltage range, which depend on the amount of $M_1$ doped, as described above, are very important.

Specifically, the number of charge/discharge cycles ($N_r$) of activation can be within the range satisfying the conditions of the following Formula III:

$$5\text{-}k'D_r \leq N_r \leq 20\text{-}k'D_r \quad\quad\quad (III)$$

wherein $N_r$ represents an integer within the range of the conditions of Formula III;

k' represents a cycle reduction constant, with the proviso that $3 \leq k' \leq 8$; and $D_r$ represents an amount of $M_1$ doped (z).

Here, the cycle reduction constant k' is a constant indicating a reduction degree of the charge/discharge cycles resulting from $M_1$ doping, based on the case where $M_1$ is not doped, more specifically $4 \leq k' \leq 7$.

The number of charge/discharge cycles ($N_r$) of activation represented by the conditions of Formula III mean the number of charge/discharge cycles which are conducted during activation on a charge/discharge unit basis and may be an integer present within the range. For example, when, regarding lithium transition metal oxide according to the present invention, the amount of $M_1$ doped (z) is 0.3 and the cycle reduction constant is 5, Formula III is $3.5 \leq N_r \leq 18.5$. In this case, the number of charge/discharge cycles ($N_r$) can be selected from 4, 5, 6, 7, 8, 9, 10, 11, 12, 13, 14, 15, 16, 17 and 18, and charge/discharge can be carried out the selected number of times during activation.

Disadvantageously, when charge/discharge is carried out excessively fewer times than the range (including a case where charge/discharge is not carried out), as described above, more inactive areas of the positive electrode active material are still present and the desired effects of the present invention cannot be realized and when charge/discharge is carried out excessively frequently, disadvantageously, the positive electrode active material is greatly damaged and battery deterioration thus occurs.

The number of charge/discharge cycles of activation can satisfy the conditions of the following Formula V:

$$6\text{-}k'D_r \leq N_r \leq 18\text{-}k'D_r \quad\quad\quad (V)$$

wherein $N_r$ represents an integer within the range of the conditions of Formula V;

k' represents a cycle reduction constant, with the proviso that $3 \leq k' \leq 8$; and $D_r$ represents an amount of $M_1$ doped (z).

Meanwhile, as described above, in the high voltage activation process, oxygen derived from the positive electrode active material including the compound represented by Formula 1, that is, the lithium transition metal oxide, causes side-reaction with the electrolyte, thus generating a great amount of gas. Accordingly, in this case, a step of removing the generated gas is required. The activation process may further include removing gas generated during repetition of charge and discharge.

The step of removing the gas can be performed as the last step of activation after several charge/discharge cycles. Although gas removal is included as the last step of activation, it can be performed as an intermediate step thereof and the number of times of gas removal is also not limited. That is, gas removal can be performed only as the last step of activation and can be performed two or more times as in the intermediate and last steps of the activation.

In this case, the method of gas removal is not particularly limited and may be selected from well-known methods in the art.

Furthermore, in a specific embodiment, regarding the compound represented by Formula 1, M' has a concentration gradient along a radius direction of particles, and the concentration of the $Li_2Mn_{1-z}M_{1-z}O_{3-y'}A_{y'}$ ingredient with respect to the total concentration of the $Li_2Mn_{1-z}M_{1z}O_{3-y'}A_{y'}$ ingredient and the $LiM'O_{2-y}A_y$ ingredient has a concentration gradient along the radius direction of particles and the concentration of the $Li_2Mn_{1-z}M_{1z}O_{3-y'}A_{y'}$ ingredient may be higher at the particle surface than in the particle center. Specifically, the difference in $Li_2Mn_{1-z}M_{1z}O_{3-y'}A_{y'}$ ingredient concentration between the particle center and the particle surface may be 0.01 to 0.9.

More specifically, in Formula 1, M' is represented by $Ni_{1-x1-y1}Co_{x1}Mn_{y1}$ ($0.1 \leq x1\text{-}y1 \leq 0.9$, $0.1 \leq x1 \leq 0.8$, $0 \leq y1 \leq 0.3$) in the particle center and is represented by $Ni_{1-x2-y2}Co_{x2}Mn_{y2}$ ($0 \leq 1\text{-}x2\text{-}y2 \leq 0.9$, $0 \leq x2 \leq 0.5$, $0.2 \leq y2 \leq 0.5$) at the particle surface, and Ni, Mn, and Co have a concentration gradient along the radius direction of particles and can satisfy relations of $y1 \leq y2$, and $x2 \leq x1$.

Here, the particle center means a region spaced by 0.01 μm to 0.1 μm from the particle center of particles, and the particle surface means a region spaced by 0.01 μm to 0.1 μm internally from the edge surface of particles.

The method of preparing the compounds having a concentration gradient is not particularly limited and any method may be used without limitation so long as it has a difference in transition metal concentration between the center and surface areas.

In a specific embodiment, the positive electrode active material according to the present invention may include, in addition to one or more lithium transition metal oxides selected from the compounds represented by Formula 1, layered compounds such as lithium cobalt oxide ($LiCoO_2$) and lithium nickel oxide ($LiNiO_2$), or their compounds substituted by one or more transition metals; lithium manganese oxides such as compounds represented by $Li_{1+x}Mn_{2-x}O_4$ (in which $0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-x}M_xO_2$ (M=Co, Mn, Al, Cu, Fe, Mg, B or Ga, and $0.01 \leq x \leq 0.3$); lithium manganese composite oxides represented by $LiMn_{2-x}M_xO_2$ (M=Co, Ni, Fe, Cr, Zn or Ta, and $0.01 \leq x \leq 0.1$), or $Li_2Mn_3MO_8$ (M=Fe, Co, Ni, Cu or Zn); lithium manganese composite oxides having a spinel structure represented by $LiNi_8Mn_{2-x}O_4$; $LiMn_2O_4$ wherein Li is partially substituted by alkaline earth metal ions; disulfide compounds; and $Fe_2(MoO_4)_3$. In this case, the one or more lithium transition metal oxides selected from compounds represented by Formula 1 may be present in an amount of 60% by weight or more, more specifically, 80% by weight or more, based on the total weight of the positive electrode active material.

The present invention also provides a lithium secondary battery manufactured by the method.

As such, the lithium secondary battery, which includes the one or more lithium transition metal oxides selected from compounds represented by Formula 1 as the positive electrode active material and is manufactured by activation under certain conditions, and the total amount of gas generated during 100 cycles or more after activation may be 2,000 ml or less and, more specifically, the total amount of gas generated during 100 cycles or more after activation may be 1,000 ml or less.

Meanwhile, the lithium secondary battery may be selected from the group consisting of a lithium ion battery, a lithium polymer battery and a lithium ion polymer battery.

Such a lithium secondary battery generally has a structure in which an electrode assembly including a positive electrode, a negative electrode and a separator interposed between the positive electrode and the negative electrode is accommodated in a battery case and is impregnated with a lithium salt-containing non-aqueous electrolyte.

The positive electrode is fabricated by applying an electrode mix, which is a mixture consisting of a positive electrode active material, a conductive material and a binder, to a positive electrode current collector, followed by drying. If necessary, the mixture may further include a filler.

The positive electrode current collector is generally fabricated to a thickness of 3 to 500 μm. There is no particular limit as to the positive electrode current collector, so long as it has excellent conductivity without causing adverse chemical changes in the fabricated battery. Examples of the positive electrode current collector include stainless steel, aluminum, nickel, titanium, sintered carbon, and aluminum or stainless steel surface-treated with carbon, nickel, titanium, silver or the like. The current collector may also be processed to form fine irregularities on the surface thereof so as to enhance adhesion to the positive electrode active material. In addition, the current collector may be used in various forms including films, sheets, foils, nets, porous structures, foams and non-woven fabrics.

The conductive material is typically added in an amount of 1 to 50% by weight, based on the total weight of the mixture including the positive electrode active material. Any conductive material may be used without particular limitation so long as it has suitable conductivity without causing adverse chemical changes in the battery. Examples of the conductive material include graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and conductive materials such as polyphenylene derivatives.

The binder is a component assisting in binding between an active material and a conductive material and in binding of the active material to a current collector. The binder is typically added in an amount of 1 to 50% by weight, with respect to the total weight of the mixture including the positive electrode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymers (EPDM), sulfonated EPDM, styrene butadiene rubber, fluororubber and various copolymers.

The filler may be optionally added to suppress expansion of the positive electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The negative electrode is fabricated by applying a negative electrode active material to a negative electrode current collector, followed by drying and pressing. If necessary, the negative electrode may optionally further include the conductive material, the binder, the filler and the like.

The negative electrode active material may include: carbons such as incompletely-graphitized carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me:Mn, Fe, Pb, Ge; Me':Al, B, P, Si, Group I, Group II and Group III elements, halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; titanium oxides; lithium titanium oxides and the like.

The negative electrode current collector is generally fabricated to a thickness of 3 to 500 μm. There is no particular limit as to the negative electrode current collector, so long as it has suitable conductivity without causing adverse chemical changes in the fabricated battery. Examples of the negative electrode current collector include copper, stainless steel, aluminum, nickel, titanium, sintered carbon, and copper or stainless steel surface-treated with carbon, nickel, titanium, silver or the like, aluminum-cadmium alloys and the like. In addition, similar to the positive electrode current collector, if necessary, the negative electrode current collector may be processed to form fine irregularities on the surface thereof so as to enhance adhesion of the negative electrode active material. In addition, the current collector may be used in various forms including films, sheets, foils, nets, porous structures, foams and non-woven fabrics.

The separator is interposed between the positive electrode and the negative electrode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may serve as both the separator and the electrolyte.

The battery case may be a metal can or a pouch-type battery case made of a laminate sheet including a resin layer and a metal layer, specifically a pouch-type battery case. As described above, since the pouch-type battery case cannot maintain the outer shape thereof with a predetermined force, an area which is not inactivated during activation process is continuously activated while cycles proceed at high voltage, thus disadvantageously generating gas. The generated gas causes batteries to swell and thus vent, or the gas may remain trapped between electrodes, which severely interferes with uniform and smooth reaction at the electrodes. Accordingly, the method of manufacturing secondary batteries according to the present invention can bring about greater effects.

The lithium salt-containing non-aqueous electrolyte is composed of a non-aqueous electrolyte and a lithium salt. As the non-aqueous electrolyte, a non-aqueous organic solvent, an organic solid electrolyte, an inorganic solid electrolyte and the like may be utilized, but the present invention is not limited thereto.

Examples of the non-aqueous organic solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, imides and the like.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas and may further include fluoro-ethylene carbonate (FEC) or propene sultone (PRS).

For example, the lithium salt-containing non-aqueous electrolyte can be prepared by adding a lithium salt such as $LiPF_6$, $LiClO_4$, $LiBF_4$ and $LiN(SO_2CF_3)_2$, to a mixed solvent of a cyclic carbonate such as EC or PC as a highly dielectric solvent and a linear carbonate such as DEC, DMC or EMC as a low-viscosity solvent.

The present invention provides a battery module comprising the secondary battery as a unit battery, a battery pack including the battery module and a device including the battery pack as a power source.

Preferably, examples of the device include, but are not limited to, power tools operated by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts, energy storage systems and the like.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a voltage graph as a function of capacity in Test Example 1.

BEST MODE

Now, the present invention will be described in more detail with reference to examples, comparative examples and test examples. These examples should not be construed as limiting the scope of the present invention.

Example 1

Manufacture of Lithium Secondary Battery

90% by weight of $0.5LiNi_{0.5}Mn_{0.5}O_2$-$0.5Li_2Mn_{0.7}Ru_{0.3}O_3$ as a positive electrode active material, 5.0% by weight of natural graphite as a conductive material and 5.0% by weight of PVdF as a binder were mixed with NMP as a solvent to prepare a positive electrode mix, and a 20 μm thickness aluminum foil was coated to a thickness of 200 μm with the positive electrode mix, followed by pressing and drying, to fabricate a positive electrode. 95% by weight of artificial graphite as a negative electrode active material, 1.5% by weight of a conductive material (Super-P) and 3.5% by weight of a binder (PVdF) were mixed with NMP as a solvent to prepare a negative electrode mix and a 20 μm thickness copper foil was coated to a thickness of 200 μm with the negative electrode mix, followed by pressing and drying, to fabricate a negative electrode.

A porous polyethylene separator was interposed between the positive electrode and the negative electrode and an electrolyte containing 1M LiPF$_6$ dissolved in a carbonate solvent consisting of EC and EMC (1:2) was injected thereinto to manufacture a lithium secondary battery.

Activation

The lithium secondary battery manufactured as described above was subjected to a process including charging at 4.5V and then discharging to 4.1V under 0.1 C conditions 15 times.

Example 2

A lithium secondary battery was manufactured in the same manner as in Example 1, except that the lithium secondary battery was manufactured using 90% by weight of 0.5LiNi$_{0.5}$Mn$_{0.5}$O$_2$-0.5Li$_2$Mn$_{0.4}$Ru$_{0.6}$O$_3$ as a positive electrode active material and was activated by conducting a process including charging at 4.4V and then discharging to 4.0V under 0.1 C conditions 10 times.

Comparative Example 1

A lithium secondary battery was manufactured in the same manner as in Example 1, except that the lithium secondary battery was manufactured using 90% by weight of 0.5LiNi$_{0.5}$Mn$_{0.5}$O$_2$-0.5Li$_2$Mn$_{0.4}$Ru$_{0.9}$O$_3$ as a positive electrode active material and was activated by conducting a process including charging at 4.3V and then discharging to 3.9V under 0.1 C conditions 5 times.

Comparative Example 2

A lithium secondary battery was manufactured in the same manner as in Example 1, except that the lithium secondary battery was manufactured using 90% by weight of 0.5LiNi$_{0.5}$Mn$_{0.5}$O$_2$-0.5Li$_2$MnO$_3$ as a positive electrode active material and was activated by conducting a process including charging at 4.6V and then discharging to 4.2V under 0.1 C conditions 20 times.

Test Example 1

Information (reversible theoretical capacity resulting from oxidation/reduction, theoretical capacity upon oxygen generation by activation or the like) of the lithium secondary batteries manufactured in Examples 1 to 2, and Comparative Examples 1 to 2, and capacity before plateau, initial discharge capacity and efficiency obtained after activation and then charging/discharging in a voltage range of 4.6V to 2.5V under 0.1 C conditions were checked and are shown in FIG. 1 and Table 1 below.

As can be seen from FIG. 1 and Table 1, as Ru doping is conducted, the active voltage drops. Secondary batteries of Examples 1 to 2 including Ru-doped lithium transition metal oxide as a positive electrode active material exhibit a lower theoretical capacity of Mn$^{4+/3+}$+O$^{2-}$/O$_2^-$ and a higher theoretical capacity of Ni$^{2+/4+}$+Ru$^{4+/5+}$ than the secondary battery of Comparative Example 2 including non-doped lithium transition metal oxide, which can be beneficial in terms of structural stability. Accordingly, high capacity and discharge capacity measured before plateau were observed in the secondary batteries of Examples 1 to 2. Meanwhile, as can be seen from Comparative Example 1, as the amount of Ru doped increases above a predetermined range, the battery has excellent structure stability due to low theoretical capacity of Mn$^{4+/3+}$+O$^{2-}$/O$_2^-$ and high theoretical capacity of Ni$^{2+/4+}$+Ru$^{4+/5+}$, but has decreased substantial charge/discharge capacity due to relatively reduced contents of Mn and Ni and more suitable amount of Ru doped can be thus acquired therefrom.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the fore-going, the method of manufacturing a lithium secondary battery according to the present invention includes activation of the lithium secondary battery conducted under conditions of charge/discharge voltage ranges and number of cycles changed depending on amount of certain element doped, thereby advantageously securing structural stability of a positive electrode active material through doping of the element and suppressing additional side-reaction between the electrolyte and oxygen during cycling, while maintaining battery characteristics such as discharge capacity and efficiency immediately after activation and the like similar to lithium secondary batteries manufactured by conventional activation and thus reducing amount of gas generated during cycling, as a result, offering excellent lifespan characteristics.

The invention claimed is:

1. A method of manufacturing a lithium secondary battery comprising a positive electrode active material,
wherein the positive electrode active material comprises one or more lithium transition metal oxides selected from compounds represented by the following Formula 1 and

TABLE 1

| 0.5LiNi$_{0.5}$Mn$_{0.5}$O$_2$—0.5Li$_2$Mn$_{1-z}$Ru$_z$O$_3$, | Theoretical capacity for 1.2 Li$^+$ [mAhg$^{-1}$] | Theoretical capacity of Ni$^{2+/4+}$ + Ru$^{4+/5+}$ | Capacity measured before plateau | 1$^{st}$ charge capacity | 1$^{st}$ discharge capacity | Theoretical capacity of Mn$^{4+/3+}$ + O$^{2-}$/O$_2^-$ |
|---|---|---|---|---|---|---|
| Example 1 (z = 0.3) | 355.12 | 153.88 | 154.64 | 301.85 | 220.04 | 66~67 |
| Example 2 (z = 0.6) | 334.67 | 173.49 | 170.04 | 294.74 | 231.06 | 58~61 |
| Comparative Example 1 (z = 0.9) | 310.80 | 207.2 | 175.86 | 231.12 | 189.88 | 0~14 |
| Comparative Example 2 (z = 0) | 378.24 | 126.08 | 112.65 | 297.06 | 211.92 | 85~99 | activation of the lithium secondary battery is conducted while changing charge/discharge voltage ranges and number of cycles depending on doping amount of $M_1$ in Formula 1:

$$(1-x)\text{LiM'O}_{2-y'}A_{y'}\cdot x\text{Li}_{2-w}E_w\text{Mn}_{1-z}M_{1z}O_{3-y'}A_{y'} \quad (1)$$

wherein

M' represents $\text{Mn}_aM_b$;

M represents at least one selected from the group consisting of Ni, Ti, Co, Al, Cu, Fe, Mg, V, B, Cr, Zr, Zn and Period 2 transition metals;

$M_1$ represents at least one selected from the group consisting of Ru, Mo, Nb, Te, Re, Ti, Zr, Ir, Pt, Cr, S, W, Os and Po;

E represents an alkali metal;

A represents at least one selected from the group consisting of anions of $PO_4$, $BO_3$, $CO_3$, F and $NO_3$; and $0<x<1$; $0 \leq y \leq 0.02$; $0 \leq y' \leq 0.02$; $0<z \leq 0.6$; $0 \leq w \leq 0.5$; $0 \leq a \leq 0.5$; $0.5 \leq b \leq 1.0$; and $a+b=1$.

2. The method according to claim 1, wherein $M_1$ represents one or more selected from the group consisting of Ru, Mo, S, W, Os and Po.

3. The method according to claim 2, wherein $M_1$ represents Ru.

4. The method according to claim 1, wherein the charge/discharge voltage ($V_r$) range of the activation process satisfies conditions of the following Formula I based on a positive electrode potential:

$$4.0-kD_r \leq V_r \leq 4.8-kD_r \quad (I)$$

wherein k represents a voltage drop constant, with the proviso that $0.3 \leq k \leq 0.6$; and $D_r$ represents an amount of $M_1$ doped (z).

5. The method according to claim 4, wherein the charge voltage of the activation is equal to or higher than an active voltage ($V_a$) at which $\text{Li}_2\text{Mn}_{1-z}M_{1z}O_{3-y'}A_{y'}$ of lithium transition metal oxide begins to cause electrochemical reaction and is equal to or lower than $4.8-kD_r$ (V), and the discharge voltage of the activation is equal to or higher than $4.0-kD_r$ (V) and is lower than the active voltage ($V_a$).

6. The method according to claim 5, wherein the active voltage ($V_a$) is a within a range satisfying conditions of the following Formula II:

$$V_a = V_{s,a} - kD_r \quad (II)$$

wherein $V_{s,a}$ represents a standard active voltage when $M_1$ is not doped, with the proviso that $4.3 \leq V_{s,a} \leq 4.5$; and K and $D_r$ are defined as in Formula I above.

7. The method according to claim 1, wherein the number of charge/discharge cycles ($N_r$) of the activation is within a range satisfying the conditions of the following Formula III:

$$5-k'D_r \leq N_r \leq 20-k'D_r \quad (III)$$

wherein $N_r$ represents an integer within the range of the conditions of Formula III;

k' represents a cycle reduction constant, with the proviso that $3 \leq k' \leq 8$; and $D_r$ represents an amount of $M_1$ doped (z).

8. The method according to claim 1, wherein the activation further comprises removing gas generated by repetition of charging/discharging.

9. The method according to claim 8, wherein the removal of gas is conducted in the last step of the activation after completion of several times of charging/discharging.

10. The method according to claim 8, wherein the removal of gas is conducted in the intermediate and last steps of the activation.

11. The method according to claim 1, wherein, in the Formula, M' has a concentration gradient along a radius direction of particles, the concentration of $\text{Li}_2\text{Mn}_{1-z}M_{1z}O_{3-y'}A_{y'}$ ingredient with respect to the total concentration of the $\text{Li}_2\text{Mn}_{1-z}M_{1z}O_{3-y'}A_{y'}$ ingredient and the $\text{LiM O}_{2-y'}A_{y'}$ ingredient has a concentration gradient along the radius direction of particles, and the concentration of the $\text{Li}_2\text{Mn}_{1-z}M_{1z}O_{3-y'}A_{y'}$ ingredient is higher at a particle surface than in a particle center.

12. The method according to claim 11, wherein, in the Formula, M' is represented by $\text{Ni}_{1-x1-y1}\text{Co}_{x1}\text{Mn}_{y1}$ ($0 \leq 1-x1-y1<0.9$, $0.1 \leq x1 \leq 0.8$, $0 \leq y1 \leq 0.3$) in the particle center, and is represented by $\text{Ni}_{1-x2-y2}\text{Co}_{x2}\text{Mn}_{y2}$ ($0 \leq 1-x2-y2 \leq 0.9$, $0 \leq x2 \leq 0.5$, $0.2 \leq y2 \leq 0.5$) at the particle surface, and Ni, Mn, and Co have concentration gradients along the radius direction of particles and satisfy relations of $y1 \leq y2$, and $x2 \leq x1$.

13. A lithium secondary battery manufactured by the method according to claim 1.

14. The lithium secondary battery according to claim 13, wherein the lithium secondary battery is selected from the group consisting of a lithium ion battery, a lithium polymer battery and a lithium ion polymer battery.

15. A lithium secondary battery comprising a positive electrode active material, wherein the positive electrode active material comprises one or more lithium transition metal oxides selected from compounds represented by the following Formula 1, and the lithium secondary battery generates 2,000 ml or less in total of gas during 100 or more cycles after activation:

$$(1-x)\text{LiM'O}_{2-y'}A_{y'}\cdot x\text{Li}_{2-w}E_w\text{Mn}_{1-z}M_{1z}O_{3-y'}A_{y'} \quad (1)$$

wherein

M' represents $\text{Mn}_aM_b$;

M represents at least one selected from the group consisting of Ni, Ti, Co, Al, Cu, Fe, Mg, V, B, Cr, Zr, Zn and Period 2 transition metals;

$M_1$ represents at least one selected from the group consisting of Ru, Mo, Nb, Te, Re, Ti, Zr, Ir, Pt, Cr, S, W, Os and Po;

E represents an alkali metal;

A represents at least one selected from the group consisting of anions of $PO_4$, $BO_3$, $CO_3$, F and $NO_3$; and $0<x<1$; $0 \leq y \leq 0.02$; $0 \leq y' \leq 0.02$; $0<z \leq 0.6$; $0 \leq w \leq 0.5$; $0 \leq a \leq 0.5$; $0.5 \leq b \leq 1.0$; and $a+b=1$.

16. The lithium secondary battery according to claim 15, wherein the lithium secondary battery generates 1,000 ml or less in total of gas during 100 or more cycles after activation.

17. A battery module comprising the lithium secondary battery according to claim 13 as a unit battery.

18. A battery pack comprising the battery module according to claim 17.

19. A device comprising the battery pack according to claim 18 as a power source.

* * * * *